(12) United States Patent
Kondo et al.

(10) Patent No.: US 7,424,057 B2
(45) Date of Patent: Sep. 9, 2008

(54) DATA FORMAT TRANSCODING APPARATUS AND ASSOCIATED METHOD

(75) Inventors: Tetsujiro Kondo, Tokyo (JP); Takeharu Nishikata, Chiba (JP); Shizuo Chikaoka, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 864 days.

(21) Appl. No.: 10/657,198

(22) Filed: Sep. 9, 2003

(65) Prior Publication Data

US 2004/0126022 A1   Jul. 1, 2004

(30) Foreign Application Priority Data

Sep. 12, 2002   (JP)   ............... 2002-266328

(51) Int. Cl.
*H04B 1/66*   (2006.01)
(52) U.S. Cl. ............... 375/240.18; 375/240.2; 375/240.12; 375/240.25; 375/240.26; 382/248; 382/250; 382/235; 382/238; 382/233
(58) Field of Classification Search ............ 375/240.18, 375/240.2, 240.12, 240.25, 240.26; 382/248, 382/250, 235, 238, 233
See application file for complete search history.

(56) References Cited

U.S. PATENT DOCUMENTS

| | | | |
|---|---|---|---|
| 4,054,909 A | 10/1977 | Kojima et al. | |
| 5,469,216 A | 11/1995 | Takahashi et al. | |
| 5,488,618 A | 1/1996 | Kondo et al. | |
| 5,495,297 A | 2/1996 | Fujimori et al. | |
| 5,598,214 A | 1/1997 | Kondo et al. | |
| 5,663,764 A | 9/1997 | Kondo et al. | |
| 5,739,873 A | 4/1998 | Kondo | |
| 5,764,305 A | 6/1998 | Kondo | |
| 5,781,238 A * | 7/1998 | Kondo et al. ........... 375/240.03 |
| 5,852,470 A * | 12/1998 | Kondo et al. ............... 348/448 |

(Continued)

FOREIGN PATENT DOCUMENTS

| | | |
|---|---|---|
| EP | 0 597 724 | 5/1994 |
| EP | 0 635 978 | 1/1995 |
| EP | 0 685 800 | 12/1995 |
| EP | 0 820 195 | 1/1998 |
| EP | 0 820 197 | 1/1998 |

(Continued)

OTHER PUBLICATIONS

Jens-Rainer Ohm: Digital Bildcodierung: Repräsentation, Kompression und übertragung von Bi I dsignalen online, pp. 46-49, XP-002267166, TRANSFORMATIONEN 1995, no translation.

*Primary Examiner*—Shawn S. An
(74) *Attorney, Agent, or Firm*—Oblon, Spivak, McClelland, Maier & Neustadt, P.C.

(57) ABSTRACT

The present invention provides an apparatus for converting image data, including a block extraction unit extracts a class tap from a composite signal. A pixel-location-mode output unit determines a pixel location mode from the extracted class tap, and outputs it to a coefficient memory. A coefficient calculation unit acquires a seed coefficient from a seed coefficient memory to determine a predictive coefficient based on a transform method selection signal input from a designation unit, and stores the result into the coefficient memory. The coefficient memory supplies a predictive coefficient corresponding to the pixel location mode to a predictive calculation unit. A block extraction unit extracts a predictive tap from the composite signal, and outputs the result to the predictive calculation unit. The predictive calculation unit outputs a component signal or a transformed component signal based on the predictive tap and the predictive coefficient.

22 Claims, 13 Drawing Sheets

U.S. PATENT DOCUMENTS

| | | | |
|---|---|---|---|
| 5,859,667 | A | 1/1999 | Kondo et al. |
| 5,912,708 | A | 6/1999 | Kondo et al. |
| 5,915,234 | A | 6/1999 | Itoh |
| 5,940,539 | A | 8/1999 | Kondo et al. |
| 5,966,183 | A | 10/1999 | Kondo et al. |
| 6,016,164 | A | 1/2000 | Kawaguchi et al. |
| 6,134,348 | A | 10/2000 | Nakaya et al. |
| 6,263,105 | B1 | 7/2001 | Nakaya et al. |
| 6,323,905 | B1 | 11/2001 | Kondo et al. |
| 6,438,267 | B1 | 8/2002 | Kondo et al. |
| 2001/0031091 | A1 | 10/2001 | Kondo |

FOREIGN PATENT DOCUMENTS

| | | |
|---|---|---|
| EP | 0 851 690 | 7/1998 |
| EP | 0 890 943 | 1/1999 |
| EP | 0 895 188 | 2/1999 |
| EP | 0 951 184 | 10/1999 |
| EP | 0 989 748 | 3/2000 |
| EP | 1 039 755 | 9/2000 |
| JP | 08-307836 | 11/1996 |
| JP | 2002-196737 | 7/2002 |
| WO | WO 2002-058386 | 7/2002 |

* cited by examiner

[FIG. 1]
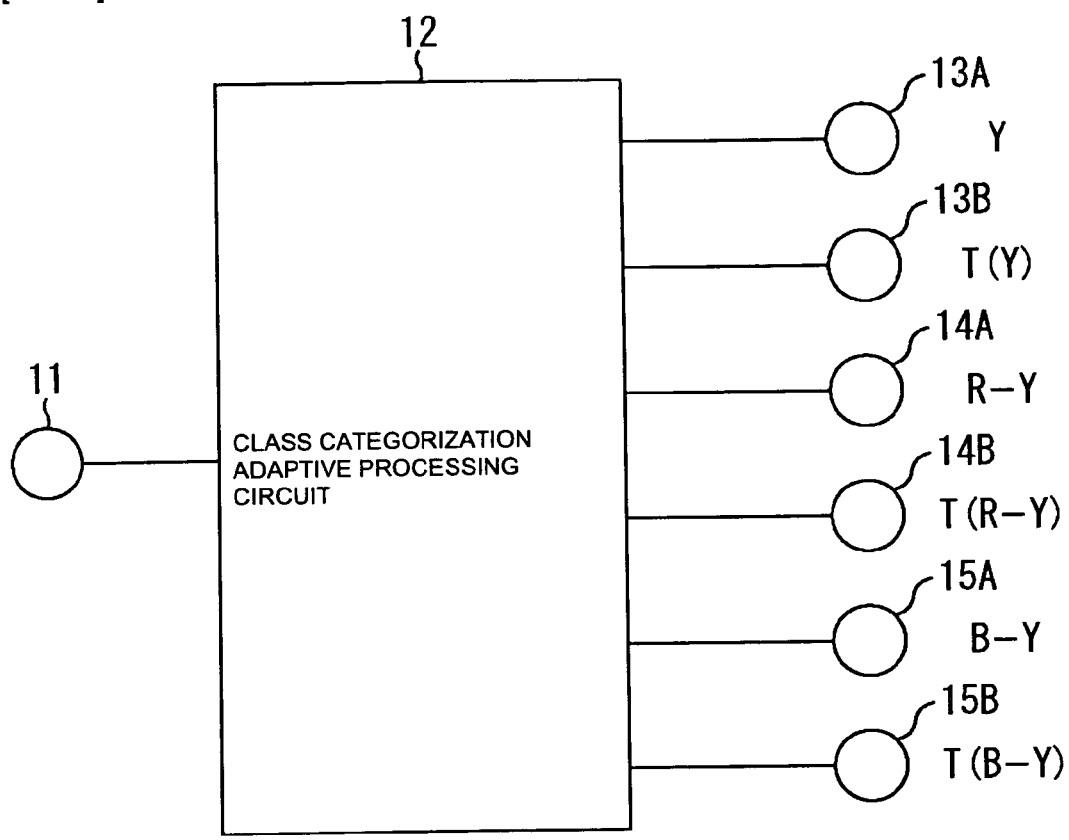

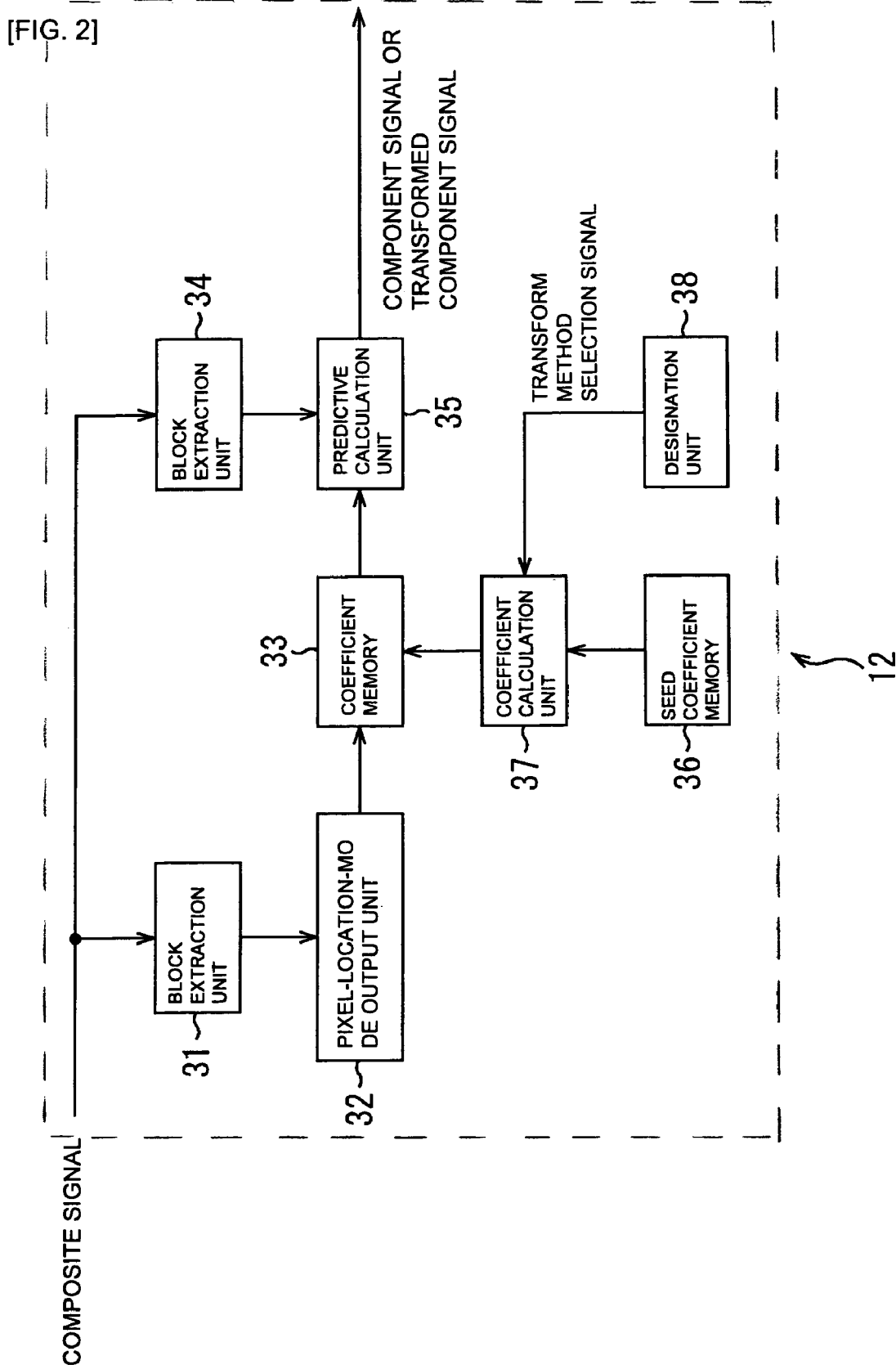

[FIG. 3]
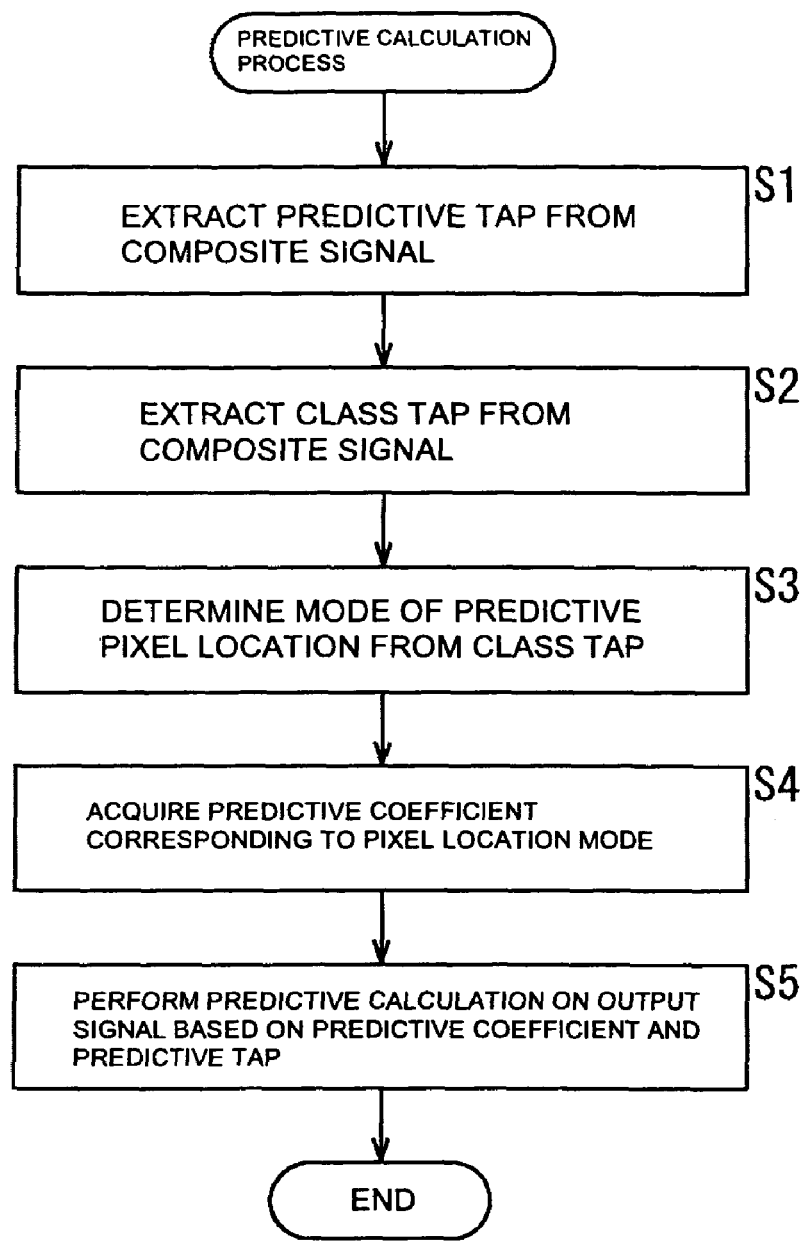

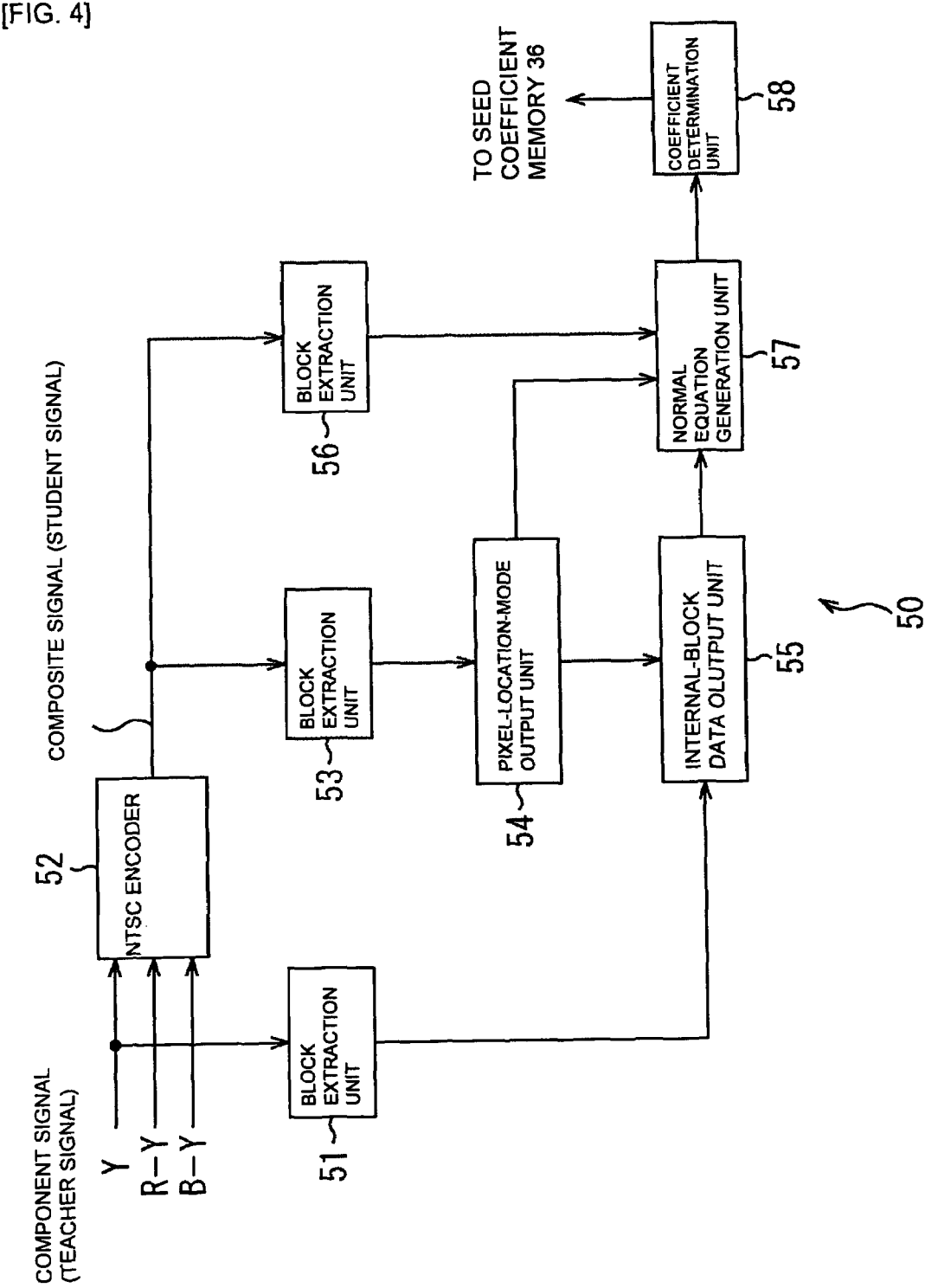

[FIG. 5]
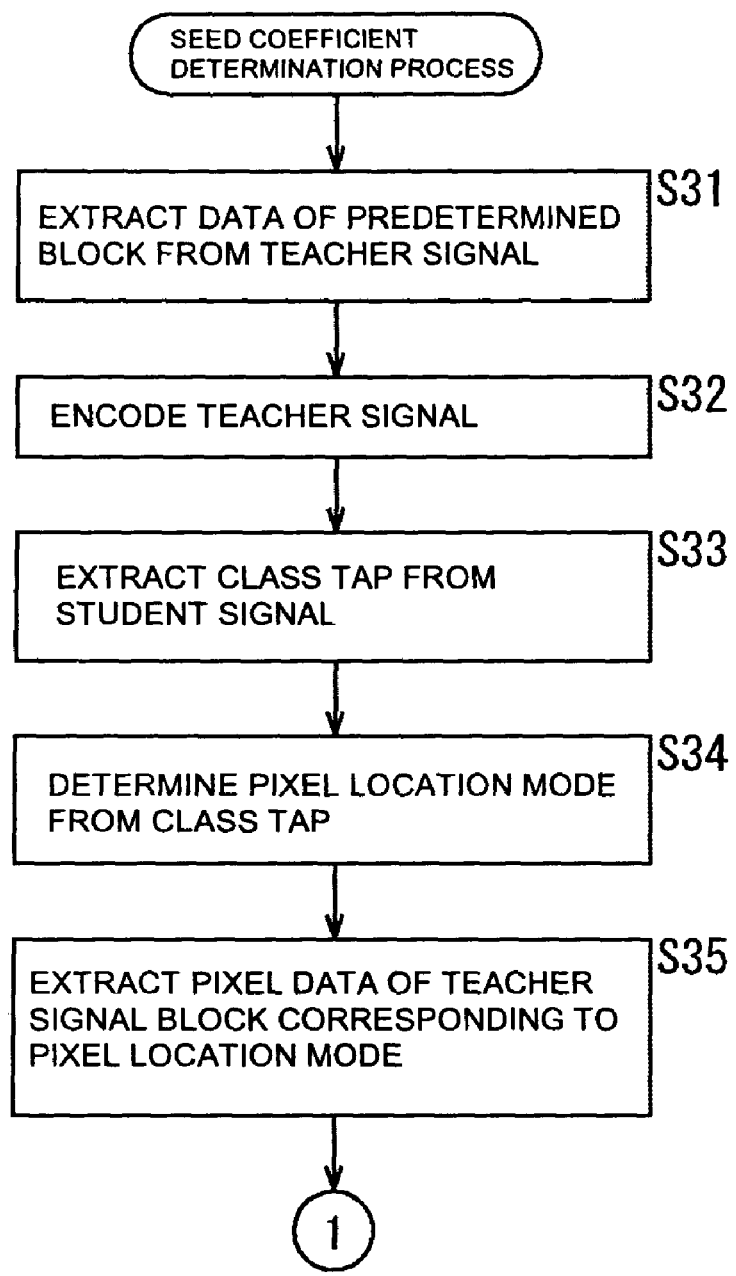

[FIG. 6]
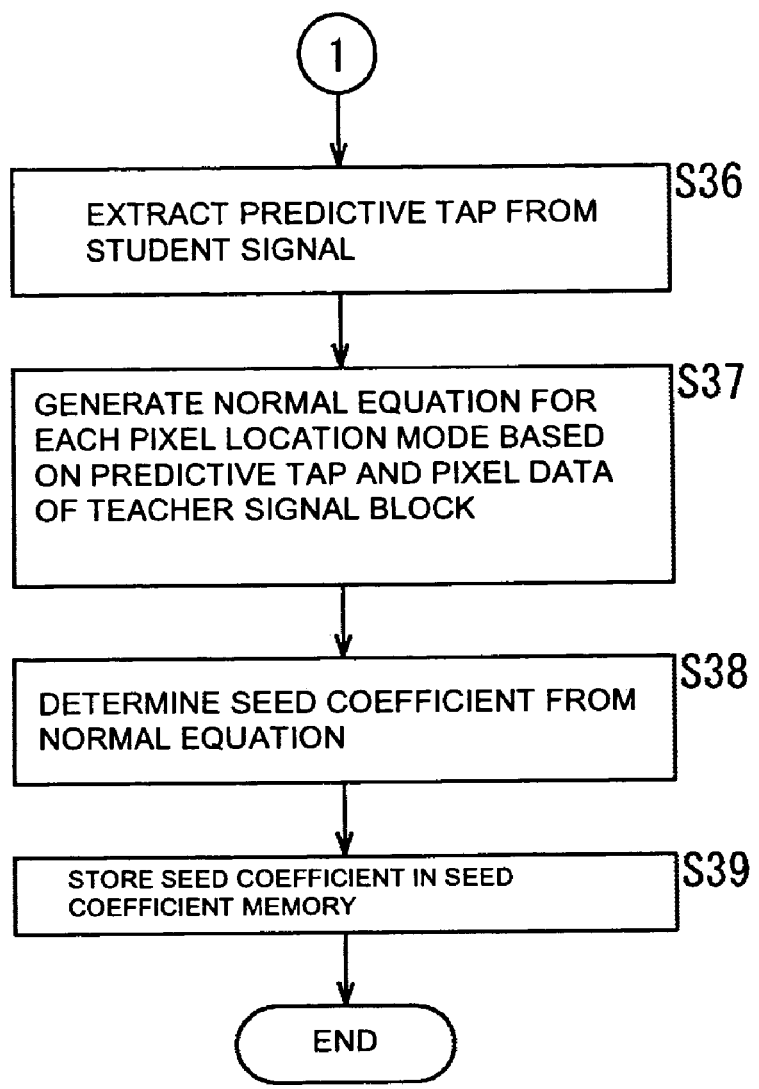

[FIG. 7]
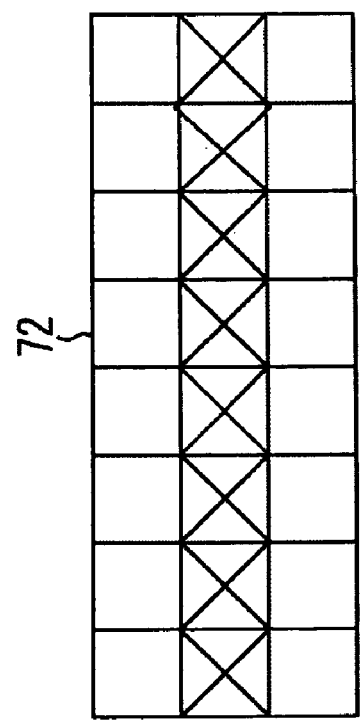
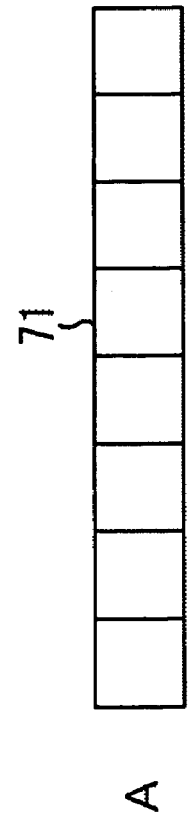
A
B

[FIG. 8]

↓ DCT $y''_1$ $y''_2$ $y''_3$ $y''_4$ $y''_5$ $y''_6$ $y''_7$ $y''_8$

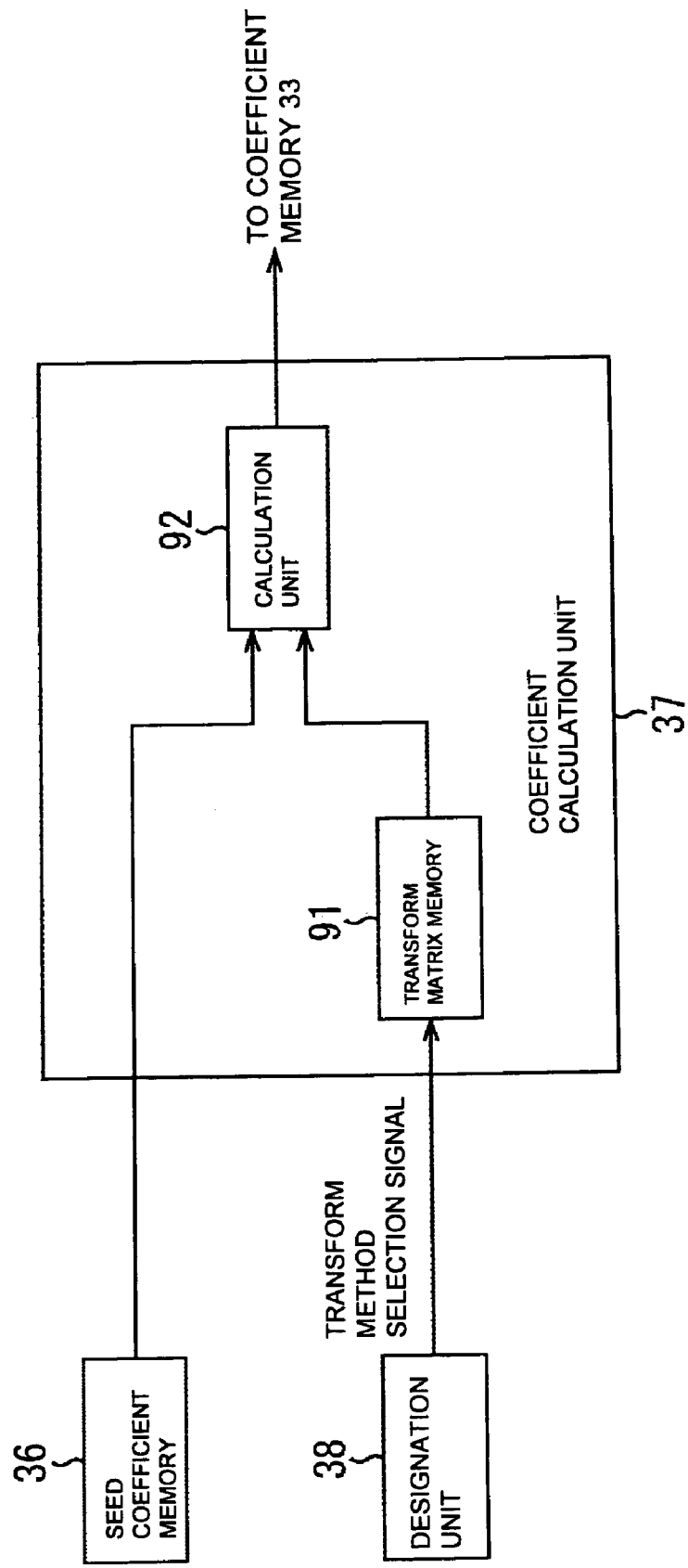
[FIG. 10]

[FIG. 11]
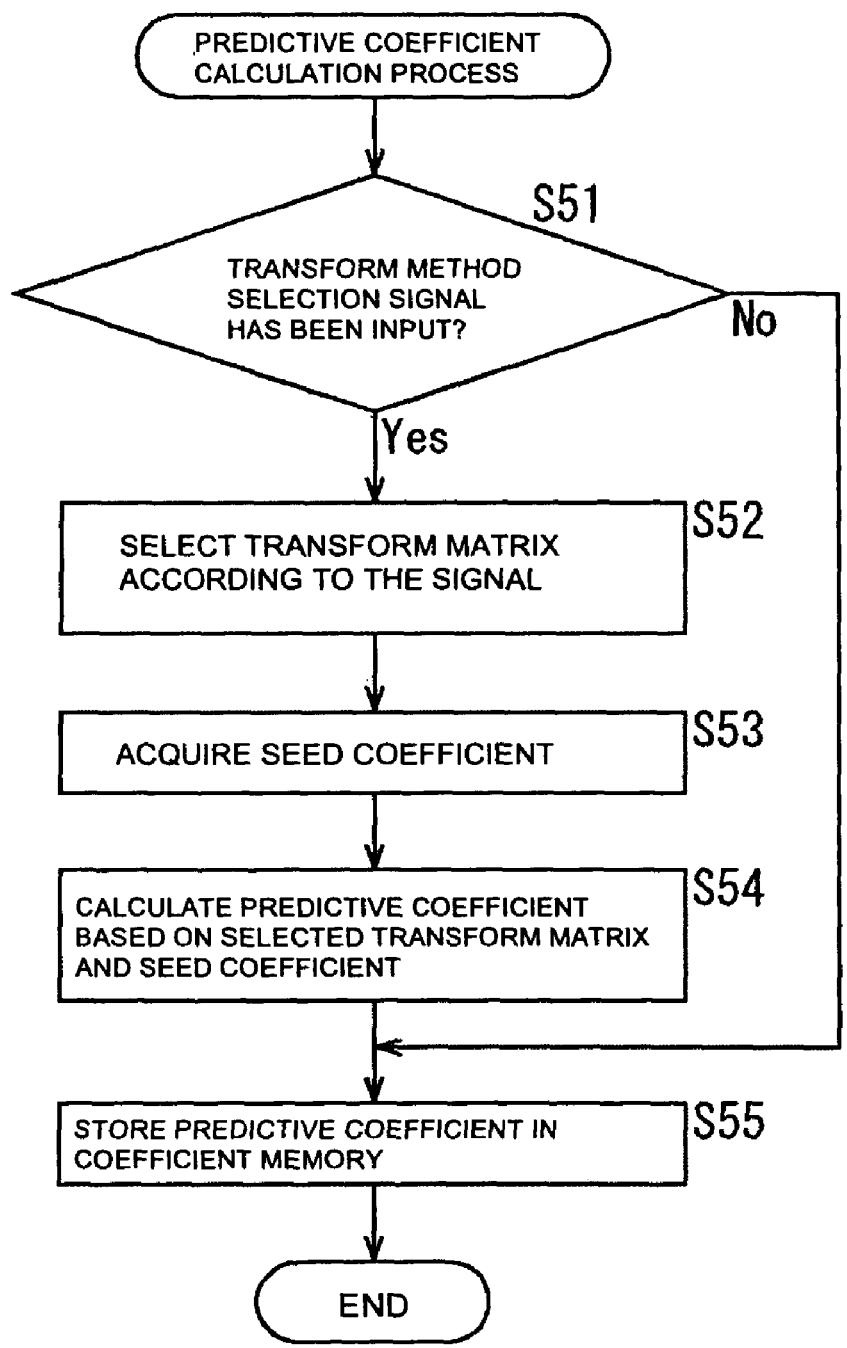

[FIG. 12]
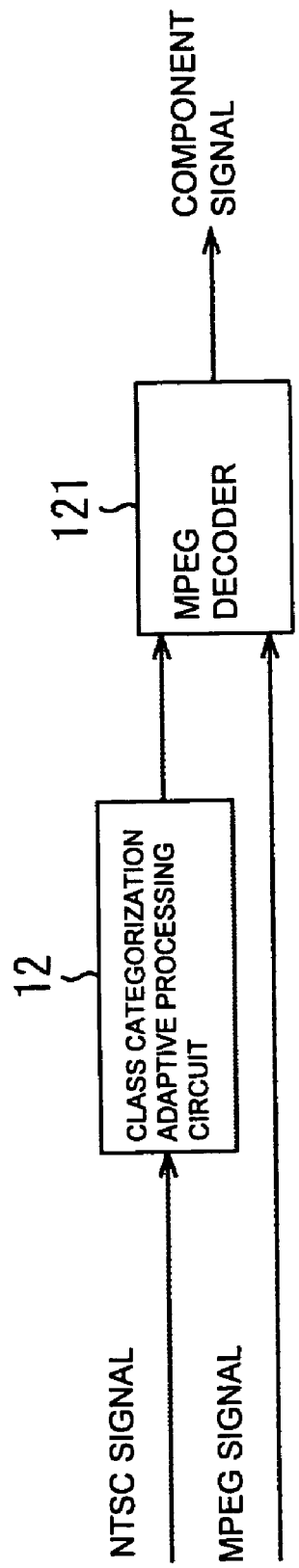

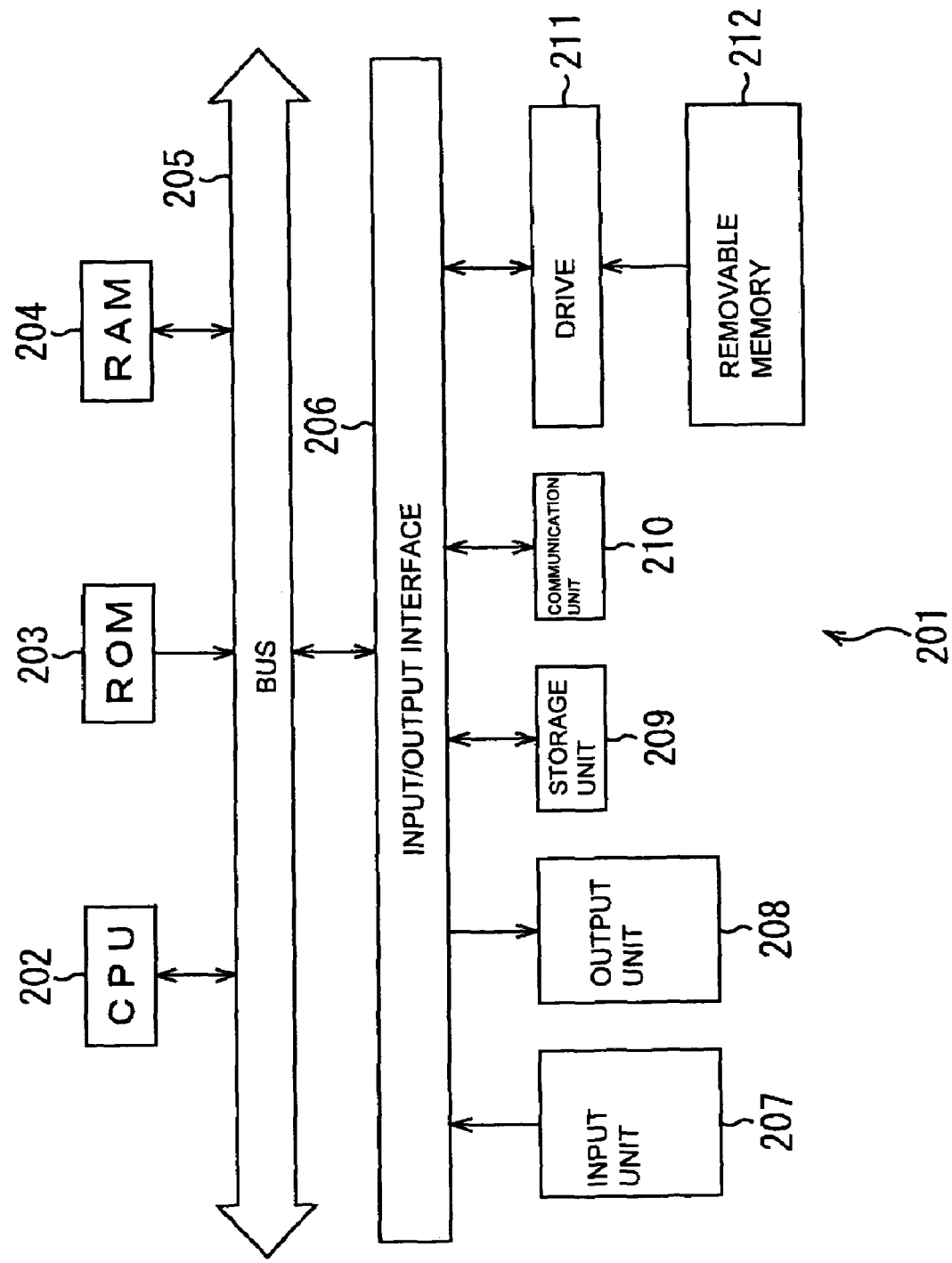
[FIG. 13]

DATA FORMAT TRANSCODING APPARATUS AND ASSOCIATED METHOD

BACKGROUND OF THE INVENTION

The present invention relates to a data processing apparatus and method, a recording medium, and a program. More particularly, the present invention relates to a data processing apparatus and method, recording medium, and program suitable for transforming input data into data of another format, and transforming the resulting data into an orthogonally transformed signal.

In the related art, since NTSC (National Television System Committee) television signals are multiplexed and encoded by balancing luminance signals (Y) with chroma signals (C), a decoder for such signals is typically configured so as to allow for separation of the luminance signals (Y) and the chroma signals (C) (Y/C separation) (see, for example, Japanese Unexamined Patent Application Publication No. 2000-138949).

Furthermore, since MPEG (Moving Picture Experts Group) video signals are divided into blocks and are then encoded using quantization, zig-zag scanning, or the like after DCT (Discrete Cosine Transform), a decoder for such signals typically determines quantized data based on a table, and performs IDCT (Inverse Discrete Cosine Transform) on the resulting data (see, for example, Japanese Unexaminaed Patent Application Publication No. 2001-320277).

In this way, the configuration of a decoder for decoding an encoded signal must correspond to the configuration (processing scheme) of an encoder. When a single apparatus is used to process input signals encoded with a plurality of schemes, a problem arises in that the apparatus requires individual decoders corresponding to different encoding schemes, resulting in an overall increase in apparatus size and complexity.

In view of the foregoing, the present invention is provided to decode an input signal by way of a single apparatus which generates signals having two or more different formats without increasing the size and/or complexity of the apparatus.

BRIEF SUMMARY OF THE INVENTION

In an exemplary embodiment, data processing apparatus of the present invention includes a first storing means for storing a first predictive coefficient obtained by learning. An instructing means instructs conversion of the first predictive coefficient, and a first calculating means calculates a second predictive coefficient from the first predictive coefficient stored by the first storing means according to a predetermined transform method when conversion is instructed by the instructing means.

The first calculating means calculates and outputs the second predictive coefficient when conversion is instructed by the instructing means, and outputs the first predictive coefficient without calculation of the second predictive coefficient when conversion is not instructed by the instructing means. The data processing apparatus may further include second storing means for storing the first predictive coefficient or second predictive coefficient output by the first calculating means.

The exemplary data processing apparatus may further include first extracting means for extracting from the input data first data based on which a class is determined, a determining means for determining the class based on the first data extracted by the first extracting means, a second extracting means for extracting second data calculated from the input data; and third calculating means for calculating output data based on the second data extracted by the second extracting means and the first predictive coefficient or second predictive coefficient stored by the second storing means. The second storing means may supply the first predictive coefficient or second predictive coefficient corresponding to the class determined by the determining means to the third calculating means.

The first predictive coefficient may be a predictive coefficient determined for each class based on third data serving as a student signal corresponding to the input data and fourth data serving as a teacher signal corresponding to the output data.

The input data may be composite signal data, and the output data can be component signal data or data obtained by converting the component signal data according to the transform method.

The data processing apparatus may further include decoding means for selecting one of data input from the outside and the output data generated by the third calculating means and for decoding the selected one.

The instructing means may further instruct the transform method, and the first calculating means can calculate the second predictive coefficient from the first predictive coefficient stored by the first storing means according to the transform method instructed by the instructing means.

The first calculating means may include third storing means for storing a transform formula corresponding to the transform method and for selecting the transform formula according to the transform method instructed by said instructing means, and can calculate the second predictive coefficient from the first predictive coefficient based on the transform formula stored by the third storing means.

The third storing means may store a transform formula corresponding to an orthogonal transform as the transform formula corresponding to the transform method.

An exemplary data processing method of the present invention includes an instructing step of instructing conversion of a first predictive coefficient which is stored and which is obtained by learning, and a calculating step of calculating a second predictive coefficient from the stored first predictive coefficient according to a predetermined transform method when conversion is instructed in the instructing step.

An exemplary program of a recording medium of the present invention includes an instructing step of instructing conversion of a first predictive coefficient which is stored and which is obtained by learning, and a calculating step of calculating a second predictive coefficient from the stored first predictive coefficient according to a predetermined transform method when conversion is instructed in the instructing step.

An exemplary program of the present invention includes a computer executable for instructing conversion of a first predictive coefficient which is stored and which is obtained by learning, and a calculating step of calculating a second predictive coefficient from the stored first predictive coefficient according to a predetermined transform method when conversion is instructed in the instructing step. According to the exemplary program, when conversion of a first predictive coefficient obtained by learning is instructed, a second predictive coefficient is calculated from the stored first predictive coefficient according to a predetermined transform method.

It is to be understood that both the foregoing general description of the invention and the following detailed description are exemplary, but are not restrictive of the invention.

BRIEF DESCRIPTION OF THE SEVERSAL VIEWS OF THE DRAWINGS

FIG. 1 is a diagram showing an exemplary structure of an image information transformation system in accordance with an embodiment of the invention;

FIG. 2 is a high level block diagram showing an exemplary structure of a class categorization adaptive processing circuit shown in FIG. 1;

FIG. 3 is a flowchart showing a predictive calculation process of the class categorization adaptive processing circuit shown in FIG. 2;

FIG. 4 is a high level block diagram showing an exemplary structure of a learning apparatus;

FIG. 5 is a flowchart illustrating a seed coefficient determination process of the learning apparatus shown in FIG. 4;

FIG. 6 is a flowchart illustrating the seed coefficient determination process of the learning apparatus shown in FIG. 4;

FIG. 7 is a diagram showing the structure of blocks of a teacher signal and predictive taps;

FIG. 8 is a diagram showing the structure of blocks of a teacher signal and blocks of a Hadamard transformed signal;

FIG. 9 is a diagram showing the structure of blocks of a teacher signal and blocks of a DCT signal;

FIG. 10 is a high level block diagram showing the structure of a coefficient calculation unit shown in FIG. 2;

FIG. 11 is a flowchart for illustrating a predictive coefficient calculation process of the coefficient calculation unit shown in FIG. 10;

FIG. 12 is a high level block diagram showing the structure of an image information transformation apparatus; and FIG. 13 is a block diagram showing an exemplary structure of a computer system according to an embodiment of the present invention.

DETAILED DESCRIPTION OF THE INVENTION

Embodiments of the present invention are now described below with reference to the drawings wherein like reference numbers designate like elements throughout. FIG. 1 shows the configuration of an image information transformation system according to an exemplary embodiment of the present invention.

The image information transformation system includes an input terminal 11 to which a composite signal may be input (for example, an NFSC signal), a class categorization adaptive processing circuit 12, output terminals 13A through 15A from which a luminance signal Y, a color-difference signal R-Y, and a color-difference signal B-Y are output, respectively. Terminals 13B through 15B provide output signals T(Y), T(R-Y), and T(B-Y) obtained by performing an orthogonal transformation on the luminance signal Y, the color-difference signal R-Y, and the color-difference signal B-Y, respectively.

The composite signal input from the input terminal 11 is supplied to the class categorization adaptive processing circuit 12 for conversion into component signals (i.e., the luminance signal Y, color-difference signal R-Y, and color-difference signal B-Y, or conversion into the orthogonal transform signals T(Y), T(R-Y), and T(B-Y) of the NTSC signal), obtained by transforming the component signals. In the exemplary embodiment, the transformation is orthogonal. The component signals are output from the output terminals 13A through 15A or the output terminals 13B through 15B. The output terminals 13A through 15A and the output terminals 13B through 15B may be common.

FIG. 2 is a block diagram showing an exemplary structure of the class categorization adaptive processing circuit 12. The input composite signal is supplied to a block extraction unit 31 and a block extraction unit 34. The block extraction unit 31 extracts pixel data (class taps) of predesignated blocks from the supplied composite signal, and outputs the extracted data to a pixel-location-mode output unit 32. The pixel-location-mode output unit 32 outputs a mode (class) of the pixel location at which a predictive value is determined from the input pixel data (class taps) of the blocks, and supplies it to a coefficient memory 33.

A seed coefficient memory 36 stores a seed coefficient (the details thereof are described below with reference to FIG. 4) in advance. A coefficient calculation unit 37 calculates a predictive coefficient from the seed coefficient supplied from the seed coefficient memory 36 based on a transform method selection signal corresponding to a transform method of a designation unit 38. The coefficient memory 33 stores the coefficient calculated by the coefficient calculation unit 37. When a pixel location mode is input from the pixel-location-mode output unit 32, the coefficient memory 33 selects a predictive coefficient corresponding to the pixel location mode, and supplies the selected coefficient to a predictive calculation unit 35.

The block extraction unit 34 extracts pixel data (hereinafter referred to as "predictive taps") of blocks necessary for predictive generation of a component signal from the input composite signal, and outputs the extracted predictive taps to the predictive calculation unit 35.

The predictive calculation unit 35 performs predictive calculation using the predictive taps input from the block extraction unit 34 and the predictive coefficient input from the coefficient memory 33, and outputs a component signal or outputs a signal (transformed component signal) obtained by orthogonally transforming the component signal.

The predictive calculation process of the class categorization adaptive processing circuit 12 is described below with reference to the flowchart of FIG. 3. In step S1, the block extraction unit 34 extracts predictive taps from the composite signal. In step S2, the block extraction unit 31 extracts class taps from the composite signal. In step S3, the pixel-location-mode output unit 32 determines from the class taps the mode of a pixel location at which a predictive value is determined (the details thereof are described below with reference to FIG. 7). In step S4, the predictive calculation unit 35 acquires a predictive coefficient corresponding to the pixel location mode from the coefficient memory 33. At this time, by previously performing a predictive-coefficient calculation process described below with reference to FIGS. 10 and 11, the coefficient memory 33 has a predetermined predictive coefficient, which is actually used, stored therein. In step S5, the predictive calculation unit 35 performs a predictive calculation on an output signal based on the input predictive coefficient and predictive taps, and the process is complete.

FIG. 4 illustrates an example structure of a learning apparatus 50 for learning a seed coefficient for the luminance signal Y to be stored in the seed coefficient memory 36. In the exemplary embodiment, component signal serving as a "teacher signal" is formed of a set of signals including the luminance signal Y, the color-difference signal R-Y, and the color-difference signal B-Y. This teacher signal is input to the learning apparatus 50, and is then supplied to a block extraction unit 51 and an NTSC encoder 52.

In the case of learning the seed coefficients for the color different signal R-Y, the color difference signal R-Y is supplied to the block extraction unit 51 and the luminance signal Y is not supplied to the block extraction unit 51.

In the case of learning the seed coefficients for the color difference signal B-Y, the color difference signal B-Y is supplied to the block extraction unit 51 and the luminance signal Y is not supplied to the block extraction unit 51.

The block extraction unit 51 extracts data of a predesignated block region from the input luminance signal (Y), and outputs the extracted data to an internal-block data output unit 55.

The NTSC encoder 52 encodes the input teacher signal to generate an NTSC composite signal serving as a "student signal," and outputs the resulting signal to a block extraction unit 53 and a block extraction unit 56. The block extraction unit 53 extracts class taps from the supplied student signal, and outputs the extracted class taps to a pixel-location-mode output unit 54. The pixel-location-mode output unit 54 outputs a pixel location mode from the input class taps, and supplies it to the internal-block data output unit 55 and a normal equation generation unit 57. The internal-block data output unit 55 outputs pixel data of the luminance signal (Y) input from the block extraction unit 51 corresponding to the pixel location mode input from the pixel-location-mode output unit 54 to the normal equation generation unit 57.

The block extraction unit 56 extracts predictive taps from the blocks of the input student signal, and outputs the extracted predictive taps to the normal equation generation unit 57.

The normal equation generation unit 57 generates, for each pixel location mode input from the pixel-location-mode output unit 54, a normal equation from the pixel data of the teacher signal input from the internal-block data output unit 55 and the predictive taps of the student signal input from the block extraction unit 56, and outputs the generated normal equation to a coefficient determination unit 58. The coefficient determination unit 58 determines a coefficient (seed coefficient) from the supplied normal equation, and stores the seed coefficient in the seed coefficient memory 36 (FIG. 2).

A seed coefficient determination process of the learning apparatus 50 is described below in detail with reference to the flowcharts of FIGS. 5 and 6. In step S31, the block extraction unit 51 extracts data of given blocks (predesignated blocks) from a luminance (Y) signal. In step S32, the NTSC encoder 52 encodes the teacher signal to generate an NTSC composite signal (student signal). In step S33, the block extraction unit 53 extracts class taps from the student signal (encoded teacher signal). In step S34, the pixel-location-mode output unit 54 determines a pixel location mode from the class taps. In step S35, from the data of the given blocks of the teacher signal supplied from the block extraction unit 51, the internal-block data output unit 55 extracts pixel data of the blocks of the luminance signal (Y) corresponding to the pixel location mode.

In step S36, the block extraction unit 56 extracts predictive taps from the student signal. In step S37, the normal equation generation unit 57 generates a normal equation for each pixel location mode based on the predictive taps and the pixel data of the blocks of the luminance signal (Y). In step S38, the coefficient determination unit 58 calculates the normal equation to determine a seed coefficient. In step S39, the coefficient determination unit 58 stores the determined seed coefficient in the seed coefficient memory 36, and the process ends.

For example, as shown in FIG. 7 portion (A), when 1×8 pixels at the position indicated by cross marks in FIG. 7 at 72 corresponding to 1×8 teacher signal blocks 71 corresponding to a pixel location mode are predictively generated from 3×8 predictive tap blocks 72, there are eight pixel location modes (i=1, 2, 3, . . . , or 8) since eight pixel data are predictively generated from one block set. Thus, eight normal equations are generated by the following formula:

Formula 1

$$y_i = \Sigma a_{ij} x_j \qquad (1)$$

In Formula (1), as shown in FIG. 7 portion (B), y indicates the pixel value of a teacher signal, and x indicates the pixel value of a predictive tap. In the above formula, a denotes the seed coefficient, i (i=1, 2, 3, . . . , or 8) indicates the teacher signal pixel and j (j=1, 2, 3, . . . , or 24) indicates the student signal pixel.

In this way, by segmenting a signal in units of blocks and sequentially processing the signal on a block basis, a normal equation corresponding to a pixel location mode is generated, and by calculating the finally determined normal equation, the seed coefficient (a) is determined. If the number of generated normal equations is insufficient for determining the seed coefficient (a), the normal equations are calculated using, for example, a least square method to determine the seed coefficient (a).

An example where an Hadamard transform is performed on 1×8 teacher signal blocks is shown in FIG. 8, in which $y_1'$ through $y_8'$ denote the values obtained by performing an Hadamard transform on the pixel values $y_1$ through $y_8$ of the teacher signal blocks. The values $y_1'$ through $y_8'$ are given by the following formula:

Formula 2 $\qquad (2)$ $$\begin{pmatrix} y_1' \\ y_2' \\ y_3' \\ y_4' \\ y_5' \\ y_6' \\ y_7' \\ y_8' \end{pmatrix} = \frac{1}{\sqrt{8}} \begin{pmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{pmatrix} \begin{pmatrix} y_1 \\ y_2 \\ y_3 \\ y_4 \\ y_5 \\ y_6 \\ y_7 \\ y_8 \end{pmatrix}$$

Figure 9:
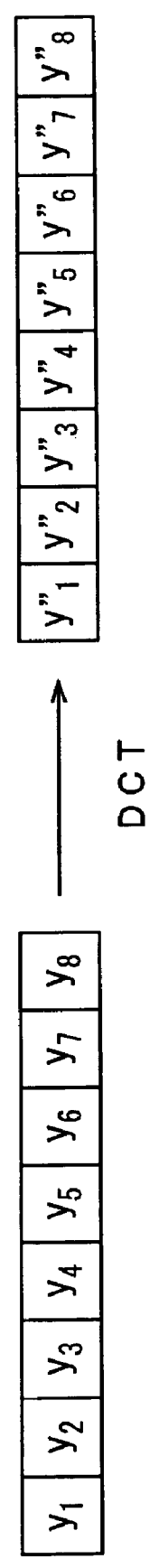

An example where DCT is performed on 1×8 teacher signal blocks is shown in FIG. 9, in which $y_1''$ through $y_8''$ denote the values obtained by performing DCT on the pixel values $y_1$ through $y_8$ of the teacher signal blocks. The values $y_1''$ through $y_8''$ are given by the following formula:

Formula 3 $\qquad (3)$ $$\begin{pmatrix} y_1'' \\ y_2'' \\ y_3'' \\ y_4'' \\ y_5'' \\ y_6'' \\ y_7'' \\ y_8'' \end{pmatrix} = C(i, j) \begin{pmatrix} y_1 \\ y_2 \\ y_3 \\ y_4 \\ y_5 \\ y_6 \\ y_7 \\ y_8 \end{pmatrix}$$

In Formula (3), where each of i and j indicates 1, 2, 3, . . . or 8 to form an 8×8 matrix, C(i,j) is given by the following formula if j is not equal to 1:

Formula 4 $\qquad (4)$ $$C(i, j) = \frac{1}{2} \cos \frac{(2i-1)(j-1)\pi}{16}$$

and is given by the following formula if j is equal to 1:

Formula 5 (5)
$$C(i, j) = \frac{1}{2\sqrt{2}}$$

Accordingly, when the transform method is an orthogonal transform such as Hadamard transform or DCT, as shown in Formulas (2) and (3), transformed signals of the pixel values $y_1$ through $y_8$ of the teacher signal blocks (Hadamard transformed signals $y_1'$ through $y_8'$ or DCT signals $y_1''$ through $y_8''$) are represented by the linear sum of the pixel values $y_1$ through $y_8$ of the teacher signal. Thus, the predictive coefficient of the transformed teacher signal (in this case, $y_1'$ through $y_8'$ or $y_1''$ through $y_8''$) can be determined from the predictive coefficient of the pixel values $y_1$ through $y_8$ of the teacher signal blocks.

Specifically, as shown in FIG. 8, assuming that the values obtained by performing an Hadamard transform on the pixel values $y_1$ through $y_8$ of the teacher signal blocks are indicated by $y_1'$ through $y_8'$, for example, $y_1'$ is given by the following formula:

Formula 6 (6)
$$y_1' = \frac{1}{\sqrt{8}}(y_1 + y_2 + y_3 + y_4 + y_5 + y_6 + y_7 + y_8)$$

Thus, when the seed coefficient for prediction of $y_1$ of a given student signal is indicated by a, and the seed coefficients for prediction of $y_2, y_3, y_4, y_5, y_6, y_7,$ and $y_8$ thereof are indicated by b, c, d, e, f, g, and h, respectively, the predictive coefficient of $y_1'$ is given by the following formula:

Formula 7 (7)
$$\frac{1}{\sqrt{8}}(a + b + c + d + e + f + g + h)$$

In a similar way to Formula (7), when the predictive coefficients of $y_2'$ through $y_8'$ are also determined from Formula (2), the predictive coefficients a' through h' for prediction of $y_1'$ through $y_8'$ of the given student signal are given by the following formula using the predictive coefficients a through h for prediction of $y_1$ through $y_8$:

Formula 8 (8)
$$\begin{pmatrix} a' \\ b' \\ c' \\ d' \\ e' \\ f' \\ g' \\ h' \end{pmatrix} = \frac{1}{\sqrt{8}} \begin{pmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{pmatrix} \begin{pmatrix} a \\ b \\ c \\ d \\ e \\ f \\ g \\ h \end{pmatrix}$$

As shown in FIG. 9, assuming that the values obtained by performing DCT on the pixel values $y_1$ through $Y_8$ of the teacher signal blocks are indicated by $y_1''$ through $y_8''$, the predictive coefficients (a) through (h) for prediction of $y_1''$ through $y_8''$ of a given student signal are given by the following formula using the predictive coefficients a through h for prediction of $y_1$ through $y_8$:

Formula 9 (9)
$$\begin{pmatrix} a'' \\ b'' \\ c'' \\ d'' \\ e'' \\ f'' \\ g'' \\ h'' \end{pmatrix} = C(i, j) \begin{pmatrix} a \\ b \\ c \\ d \\ e \\ f \\ g \\ h \end{pmatrix}$$

In Formula (9), where each of i and j indicates 1, 2, 3, . . . , or 8 to form an 8×8 matrix, C(i,j) is given by the following formula if j is not equal to 1:

Formula 10 (10)
$$C(i, j) = \frac{1}{2}\cos\frac{(2i - 1)(j - 1)\pi}{16}$$

and is given by the following formula if j is equal to 1:

Formula 11 (11)
$$C(i, j) = \frac{1}{2\sqrt{2}}$$

Thus, the coefficient calculation unit 37 of the class categorization adaptive processing circuit 12 shown in FIG. 2 has the structure shown in FIG. 10 is able to determine coefficients (predictive coefficients) for predictive calculation on an input signal from the seed coefficients. A transform matrix memory 91 has transform matrices for various transformations stored therein in advance. For example, a transform matrix for Hadamard transform given in Formula (8) or a transform matrix for DCT given in Formula (9) is stored.

Specifically, when the designation unit 38 inputs the specified transform method selection signal to the transform matrix memory 91, the transform matrix memory selects a transform matrix corresponding to the transform method selection signal from the stored transform matrices, and outputs the selected one to a calculation unit 92. The seed coefficient memory 36 outputs the seed coefficient stored and determined by the learning apparatus 50 to a calculation unit 92.

The calculation unit 92 determines a predictive coefficient based on the input transform matrix and seed coefficient, and outputs it to the coefficient memory 33.

Although the case where the learning apparatus 50 determines the seed coefficient of the Y signal of the component signal (teacher signal) has been discussed, the seed coefficients of the color-difference signals R-Y and B-Y of the component signals can also be determined by a similar process.

If one type of transform matrix is stored in the transform matrix memory 91, the transform method selection signal output from the designation unit 38 is a signal for selecting whether or not that transform matrix is used.

A predictive coefficient calculation process of the coefficient calculation unit 37 is described below in detail with reference to the flowchart of FIG. 11. This process is executed according to a user instruction before the predictive calculation process shown in FIG. 3 is executed.

Specifically, a designation unit 38 operates to specify which method of a plurality of transform methods is used. In the exemplary embodiment, this operation is designated by user input, however, those skilled in the art will recognize that such selection may be provided automatically in response to one or more system parameters. Thus, in step S51, the transform matrix memory 91 determines, based on the designation, whether or not a transform method selection signal has been input from the designation unit 38. If it is determined that a transform method selection signal has been input, the process proceeds to step S52, in which the transform matrix memory 91 selects a predetermined transform matrix from the stored transform matrices according to the transform method selection signal. Therefore, for example, the transform matrix (Formula (8)) for Hadamard transform or the transform matrix (Formula (9)) for DCT is selected. Of course, the above transforms are illustrative examples rather than an exhaustive list of possible transforms as known to those skilled in the art.

In step S53, the calculation unit 92 acquires the seed coefficient from the seed coefficient memory 36. In step S54, the calculation unit 92 determines the predictive coefficient based on the selected transform matrix and the acquired seed coefficient. Thus, from the seed coefficients a through h read from the seed coefficient memory 36, for example, the coefficients (a) through (h) are determined based on Formula (8) when the transform matrix for Hadamard transform is selected, and the coefficients (a) through (h) are determined based on Formula (9) when the transform matrix for DCT is selected. In step S55, the calculation unit 92 stores the determined predictive coefficients in the coefficient memory 33.

If it is determined in step S51 that no transform method selection signal has been input, this means that no instruction of transform has been performed, and the process proceeds to step S55, in which the transform matrix memory 91 stores the seed coefficient in the coefficient memory 33 without change.

In this way, the predictive calculation process described with reference to the flowchart of FIG. 3 is performed using the predictive coefficient stored in the coefficient memory 33. As a result, when no transform method has been selected, the NTSC component signals (i.e., the luminance signal Y, the color-difference signal R-Y, and the color-difference signal B-Y), are output from the output terminals 13A through 15A shown in FIG. 1. For example, when the transform matrix for Hadamard transform has been selected, the transform signals T(Y), T(R-Y), and T(B-Y) obtained by performing an Hadamard transform on the component signals are output from the output terminals 13B through 15B; and when the transform matrix for DCT has been selected, the transform signals T(Y), T(R-Y), and T(B-Y) obtained by performing DCT on the component signals are output from the output terminals 13B through 15B.

According to the present invention, therefore, based on the seed coefficient, a composite signal can be converted into component signals or can be directly converted into signals obtained by performing an orthogonal transform on the component signals. Furthermore, it is not necessary to learn predictive coefficients for each transform method, in which case the capacity of a memory for storing predictive coefficients can be reduced compared to the case where predictive coefficients for all different transform methods must be stored. Furthermore, it is only required to change transform matrices stored in the transform matrix memory 91 in order to acquire predictive coefficients for different transform methods, and the transform matrices can be easily changed and/or updated.

To this end, the transform matrix memory 91 may be an externally rewritable memory so that the content of the stored transform matrices can be modified.

In the foregoing description, the predictive tap is divided into 3×8 blocks and the teacher signal is divided into 1×8 blocks; however, those skilled in the art will recognize that such block division is exemplary only and that alternative groupings are possible the way by which these are divided into blocks may be arbitrary.

In the foregoing description, furthermore, an NTSC signal is directly converted into signals obtained by performing an orthogonal transform such as Hadamard transform or DCT on component signals (i.e., the luminance signal Y, the color-difference signal R-Y, and the color-difference signal B-Y). However, any signal other than an NTSC signal or a video signal may be converted as long as teacher signal blocks and student signal blocks have one-to-one correspondence and each block is independent from other blocks during the learning operation of the learning apparatus.

FIG. 12 is a block diagram showing an example structure of an image information transformation apparatus including the above-described class categorization adaptive processing circuit 12 equipped with a decoder. This image information transformation apparatus is constructed as, for example, a television receiver.

In the image information transformation apparatus, an NTSC composite signal is input to the class categorization adaptive processing circuit 12. The class categorization adaptive processing circuit 12 directly converts the input NTSC signal into a DCT component signal, and outputs the resulting signal to an MPEG decoder 121. The MPEG decoder 121 decodes the input DCT component signal, and outputs a component signal.

In the image information transformation apparatus of the exemplary embodiment, an MPEG signal is directly supplied to the MPEG decoder 121. The MPEG decoder 121 decodes the MPEG signal and outputs a component signal.

As can be appreciated, by providing a decoder for the data processing apparatus of the present invention, this single decoder can be used to process signal encoded with various methods.

Although an MPEG signal is used in the above-described example, an image information transformation apparatus to which both another signal such as an Hadamard transformed signal and an NTSC signal are input may also be used. In this case, in place of the MPEG decoder 121, for example, a decoder for performing the inverse Hadamard transform is used.

The above-described sequence of processes may be executed by either hardware or software implementation. When the sequence of processes is executed by software, a program constituting the software is installed into a general-purpose computer or embodied in the carrier such as magnetic or optical disc or a radio frequency or audio frequency carrier wave.

FIG. 13 shows an example structure of an embodiment of a computer 201 to which a program for executing the above-described sequence of processes is installed.

The computer 201 includes a built-in CPU (Central Processing Unit) 202. An input/output interface 206 is connected to the CPU 202 via a bus 205. A ROM (Read Only Memory) 203 and a RAM (Random Access Memory) 204 are connected to the bus 205.

An input unit 207 formed of input devices such as a keyboard and a mouse operated by a user, a scanner, and a microphone, and an output unit 208 formed of output devices such as a display, a speaker, a printer, and a plotter are connected to the input/output interface 206. A storage unit 209 such as a hard disk drive for storing a program or various data, and a communication unit 210 for communicating data over a variety of networks including the Internet are connected to the input/output interface 206.

A drive 211 for reading and writing data from and to a recording medium such as a removable memory 212 is also connected to the input/output interface 206, as required.

An image information transformation program which causes the computer 201 to execute an operation as an image information transformation apparatus according to the present invention is offered to the computer 201 as is stored in the removable memory 212, and is read by the drive 211 and installed to the hard disk drive built in the storage unit 209. The information processing program installed to the storage unit 209 is loaded, according to an instruction of the CPU 202 corresponding to a user command input to the input unit 207, from the storage unit 209 to the RAM 204 in which it is executed.

This recording medium is formed of not only a packaged media such as the removable memory 212 having a program stored therein, which is distributed separately from the apparatus to offer the program to users, as shown in FIG. 13, but also formed of the ROM 203 having a program recorded therein, a hard disk contained in the storage unit 209, or the like which is offered to users as is incorporated in the apparatus in advance.

Those skilled in art will recognize that the process steps describing a program which causes a computer to execute various functions of the invention are not necessarily performed in a time-series manner according to the order described in the flowcharts, and include a process performed in parallel or discrete manner (for example, a parallel process or an object-based process).

According to the present invention, therefore, input data can be converted into data of another format, and, particularly, can be readily converted into any of data of a plurality of formats. Furthermore, transform methods can be readily changed. Furthermore, signals encoded with a plurality of methods can be processed using a single decoder.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject material is dedicated to the public.

This Application claims the benefit of Japanese priority document JP 2002-266328, filed in Japan on Sep. 12, 2002, the entire contents of which is incorporated by reference herein in its entirety.

The invention claimed is:

1. A data processing apparatus for performing a predetermined predictive calculation on input data using a predictive coefficient, comprising:

first storing means for storing a first predictive coefficient obtained by learning;

instructing means for instructing conversion of the first predictive coefficient; and first calculating means for calculating a second predictive coefficient from the first predictive coefficient according to a predetermined transform method when conversion is instructed by said instructing means.

2. The data processing apparatus according to claim 1, wherein the first calculating means calculates and outputs the second predictive coefficient when conversion is instructed by the instructing means, and outputs the first predictive coefficient without calculation of the second predictive coefficient when conversion is not instructed by the instructing means.

3. The data processing apparatus, according to claim 2, further comprising:

second storing means for storing the first predictive coefficient or the second predictive coefficient output from the first calculating means.

4. The data processing apparatus according to claim 3, further comprising:

first extracting means for extracting, from the input data, first data;

determining means responsive to the first extracting means for determining a class based on the first data;

second extracting means for extracting second data calculated from the input data; and third calculating means for calculating output data based on the second data extracted by the second extracting means and the first predictive coefficient or the second predictive coefficient stored by the second storing means, wherein the second storing means supplies the first predictive coefficient or the second predictive coefficient corresponding to the class determined by the determining means to the third calculating means.

5. The data processing apparatus according to claim 4, wherein the first storing means stores the first predictive coefficient being a predictive coefficient determined for each class based on third data serving as a student signal corresponding to the input data, and fourth data serving as a teacher signal corresponding to the output data.

6. The data processing apparatus according to claim 4, wherein the first extracting means extracts the input data including composite signal data, and the third calculating means calculates the output data including component signal data defined as data obtained by converting the component signal data according to the predetermined transform method.

7. The data processing apparatus according to claim 4, further comprising:

decoding means for selecting data input and the output data generated by the third calculating means and for decoding the selected data input.

8. The data processing apparatus according to claim 1, wherein the instructing means designates the transform method, and the first calculating means calculates the second predictive coefficient from the first predictive coefficient stored by the first storing means according to the transform method instructed by the instructing means.

9. The data processing apparatus according to claim 8, wherein the first calculating means includes a third storing means for storing a transform formula corresponding to the transform method and for selecting the transform formula according to the transform method designated by the instructing means, and calculates the second predictive coefficient from the first predictive coefficient based on the transform formula stored by the third storing means.

10. The data processing apparatus according to claim 9, wherein the third storing means stores a transform formula corresponding to an orthogonal transform as the transform formula corresponding to the transform method.

11. A data processing apparatus for performing a predetermined predictive calculation on input data using a predictive coefficient, comprising:
   a first memory configured to store a first predictive coefficient obtained by learning;
   a designation unit configured to instruct conversion of the first predictive coefficient; and
   a coefficient calculation unit configured to calculate a second predictive coefficient from the first predictive coefficient according to a predetermined transform method when conversion is instructed by the designation unit.

12. The data processing apparatus according to claim 11, wherein the coefficient calculation unit is configured to calculate and output the second predictive coefficient when conversion is instructed by the designation unit, and to output the first predictive coefficient without calculation of the second predictive coefficient when conversion is not instructed by the designation unit.

13. The data processing apparatus, according to claim 12, further comprising:
   a second memory configured to store the first predictive coefficient or the second predictive coefficient output from the coefficient calculation unit.

14. The data processing apparatus according to claim 13, further comprising:
   a first extraction unit configured to extract, from the input data, first data;
   a classification unit, responsive to the first extraction unit, configured to determine a class based on the first data;
   a second extraction unit configured to extract second data calculated from the input data; and
   a predictive calculation unit configured to calculate output data based on the second data extracted by the second extraction unit and the first predictive coefficient or the second predictive coefficient stored by the second memory,
   wherein the second memory is configured to supply the first predictive coefficient or the second predictive coefficient corresponding to the class determined by the classification unit to the predictive calculation unit.

15. The data processing apparatus according to claim 14, wherein the first memory is configured to store the first predictive coefficient being a predictive coefficient determined for each class based on third data serving as a student signal corresponding to the input data, and fourth data serving as a teacher signal corresponding to the output data.

16. The data processing apparatus according to claim 14, wherein the first extraction unit is configured to extract from the input data comprising composite signal data, and the predictive calculation unit is configured to calculate the output data comprising component signal data or data obtained by converting the component signal data according to the predetermined transform method.

17. The data processing apparatus according to claim 14, further comprising:
   a decoder configured to select data input, and the output data generated by the predictive calculation unit and to decode the selected data input.

18. The data processing apparatus according to claim 11, wherein the designation unit is configured to designate the transform method, and
   the coefficient calculation unit is configured to calculate the second predictive coefficient from the first predictive coefficient stored by the first memory according to the transform method instructed by the designation unit.

19. The data processing apparatus according to claim 18, wherein the coefficient calculation unit includes a third memory configured to store a transform formula corresponding to the transform method and to select the transform formula according to the transform method designated by the designation unit, and is configured to calculate the second predictive coefficient from the first predictive coefficient based on the transform formula stored by the third memory.

20. The data processing apparatus according to claim 19, wherein the third memory is configured to store a transform formula corresponding to an orthogonal transform as the transform formula corresponding to the transform method.

21. A data processing method for a data processing apparatus for performing a predetermined predictive calculation on input data using a predictive coefficient, comprising:
   storing a first predictive coefficient obtained by learning;
   instructing conversion of the first predictive coefficient;
   calculating a second predictive coefficient from the stored first predictive coefficient according to a predetermined transform method when conversion is instructed in said instructing step; and
   converting the input data into output data based on the first predictive coefficient or the second predictive coefficient.

22. A computer readable memory medium embodied with computer program instructions that cause a computer to perform a predetermined predictive calculation on input data using a predictive coefficient, the computer program comprising:
   storing a first predictive coefficient obtained by learning;
   instructing conversion of the first predictive coefficient which is stored and which is obtained by learning;
   calculating the second predictive coefficient from the stored first predictive coefficient according to a predetermined transform method when conversion is instructed in said instructing step; and
   converting the input data into output data based on the first predictive coefficient or the second predictive coefficient.

* * * * *